(12) United States Patent
Duyckinck et al.

(10) Patent No.: US 6,261,496 B1
(45) Date of Patent: Jul. 17, 2001

(54) CONTINUOUS COMPOUNDING OF AQUEOUS INJECTION MOLDING FEEDSTOCKS

(75) Inventors: Richard L. Duyckinck, Ringoes; Brian Snow, Parsippany; Steven Sesny; George Glandz, both of Toms River, all of NJ (US)

(73) Assignee: AlliedSignal Inc., Morris Township, NJ (US)

( * ) Notice: Subject to any disclaimer, the term of this patent is extended or adjusted under 35 U.S.C. 154(b) by 0 days.

(21) Appl. No.: 09/354,029

(22) Filed: Jul. 15, 1999

(51) Int. Cl.[7] .............................. B29B 7/42; B29B 9/06; B29C 45/00
(52) U.S. Cl. ................... 264/118; 264/122; 264/328; 264/17; 264/328.18; 419/36; 419/65
(58) Field of Search ..................... 264/109, 118, 264/122, 328.17, 328.18; 419/36, 65

(56) References Cited

U.S. PATENT DOCUMENTS

| | | | |
|---|---|---|---|
| 4,113,480 | 9/1978 | Rivers | 75/214 |
| 4,734,237 | 3/1988 | Fanelli et al. | 264/122 |
| 4,734,727 | 3/1988 | Takemae | 354/412 |
| 5,087,595 | 2/1992 | Marsh et al. | 501/105 |
| 5,132,255 | * 7/1992 | Takeuchi et al. | 501/94 |
| 5,250,251 | 10/1993 | Fanelli et al. | 264/328.2 |
| 5,258,155 | 11/1993 | Sekido et al. | 264/109 |

* cited by examiner

*Primary Examiner*—Leo B. Tentoni
(74) *Attorney, Agent, or Firm*—Roger H. Criss

(57) ABSTRACT

A novel process for preparing injection molding feedstock compounds in a continuous manner amenable to high volume manufacturing includes the steps of forming a mixture including metal and/or ceramic powders, a binder and a liquid carrier, supplying the components in a continuous manner to a twin screw extruder, forcing the homogeneous compounded mixture through an exit die, and cutting the extruded strand into pellets. The pellets are useful for shape-forming articles by various molding processes.

18 Claims, 3 Drawing Sheets

Continuous Compounding of Molding Compounds

CONTINUOUS COMPOUNDING OF AQUEOUS INJECTION MOLDING FEEDSTOCKS

FIELD OF THE INVENTION

This invention relates to processes for shaping metal and ceramic parts from powders, and molding compositions therefor. More particularly, the invention is directed to material compounding processes for producing molding compositions that can be shaped into complex parts which exhibit excellent green strength and which can be readily fired into high quality sintered products.

BACKGROUND OF THE INVENTION

The production of sintered parts from "green" bodies is well known in the art. Generally, the green body is formed by filling a die with a powder/binder mixture and compacting the mixture under pressure to produce the green body. The green body, a self-supporting structure, is then removed from the die and sintered. During the sintering process, the binder is volatilized and burned out.

Heretofore, aqueous compositions useful as injection molding precursors have been prepared using batch-type processes. For example, U.S. Pat. No. 4,734,237 discloses the preparation of aqueous ceramic injection molding compounds using a sigma blender for blending the precursor liquid and powder ingredients. U.S. Pat. No. 5,250,251 gives examples of aqueous compositions prepared using a batch sigma mixer for molding articles from aluminum oxide, zirconium oxide and silicon nitride. Similarly, in U.S. Pat. No. 5,087,595 a batch mixer was used to prepare yttrium oxide/zirconium oxide molding compounds for fabricating oxygen sensors. Injection molding compounds containing metal powder are disclosed in U.S. Pat. No. 5,258,155, wherein the metal powder is kneaded with binder, water and other additives in a batch mixer. Aqueous injection molding compositions containing metal powder are disclosed in U.S. Pat. No. 4,113,480, wherein the binder and metal powder are pre-blended dry and then mixed with a solution of water and additives.

It is widely recognized that the quality of the green and fired metal or ceramic body is largely dependent upon the uniformity of the precursor molding feedstock composition, and that batch-to-batch variations in the feedstock produced can have a marked effect on the properties of molded objects made from such feedstock materials.

BRIEF SUMMARY OF THE INVENTION

The invention is directed to processes for preparing metal and/or ceramic injection molding compounds in a continuous manner suitable for high volume manufacturing. The invention makes possible the preparation of homogeneous molding compounds that can be manufactured in a continuous manner in high volume, and avoids the batch-to-batch variations that are typical in batch-type processes.

The molding compositions that form the subject of this invention contain metal and/or ceramic powder, a binder, a liquid carrier that serves as the transport vehicle, and optionally, other additives.

The invention comprises the steps of continuously forming a mixture, the mixture comprising metal and/or ceramic powders, a binder and a liquid carrier. The metal and/or ceramic powder, binder and liquid carrier are supplied in a continuous manner to a twin screw extruder and compounded into a homogeneous feedstock composition. After the continuous strand of feedstock material exits the extruder through a die, it is sliced into pellets. Optionally, other additives can be added to the powder/binder mixture to produce certain desirable properties of the feedstock composition.

DETAILED DESCRIPTION OF THE INVENTION

According to the present invention, molding compounds containing metal and/or ceramic powders are formed in a continuous process. As used herein, the term metal powders includes powders of pure metals, alloys, intermetallic compounds and mixtures thereof. The term ceramic powders as used herein is intended to include, without limitation, powders of such materials as oxides, borides, nitrides, silicides, and carbides of metals, nonmetals or mixtures thereof, and mixtures of such materials.

According to the process, the metal and/or ceramic powders are fed continuously through entrance ports into a twin-screw extruder and compounded with a binder and a liquid carrier. Optionally, additives to produce certain desirable properties in the feedstock composition may be similarly fed through entrance ports into the extruder. Each component may be introduced to the twin screw via a separate entrance port or may be pre-blended with one or more of the other components and delivered through a common port. The components may be in the form of powders, liquids and suspensions of powders in liquids. The components may receive pretreatment before being delivered to the twin screw extruder; for example, metal and/or ceramic powders may be ground to reduce the particle size prior to compounding in the extruder.

Generally, the powders comprise between about 40 to 75% by volume of the mixture, and more preferably, between about 47 to 62%. The preferred amounts are quite useful in producing net and near net shape injection molded parts.

As used herein, binders include polymeric substances that, in an appropriate solvent or swelling agent, produce gels, highly viscous suspensions or solutions at low dry substance content (generally less than about 10% by weight). The binder imparts the necessary rigidity to a green article formed in a molding process from powdered material.

A wide variety of water soluble binders may be used in the instant invention including such classes of compounds as naturally occurring polysaccharides.(as described in *Industrial Gums*, Academic Press, New York, N.Y., 2d ed., 1973), synthetic polysaccharides, cellulose, chemically modified cellulose, gelatin, alginate compounds, poly(acrylamide), poly(vinylalcohol) and mixtures thereof The preferred binders comprise agaroids, which are water soluble gel-forming materials, and the most preferred gel-forming material is agar. An agaroid is defined as a gum resembling agar but not meeting all of the characteristics thereof (See H. H. Selby and W. H. Wynne, Chapt. 3, p. 29, "Agar" in *Industrial Gums*, Academic Press, New York, N.Y., 2d ed., 1973).

Figure 1:
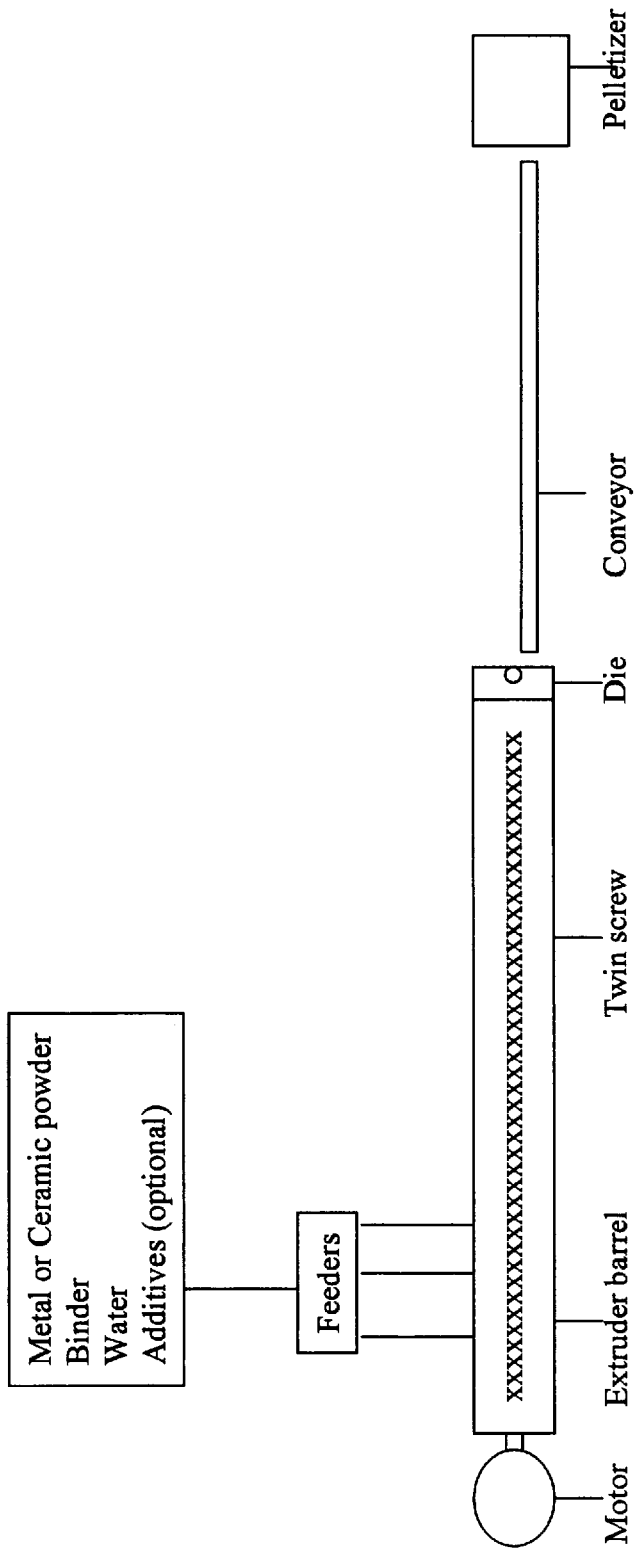
FIG. 1 is a schematic representation of the basic steps of one embodiment of the process of the invention.
Figure 2:
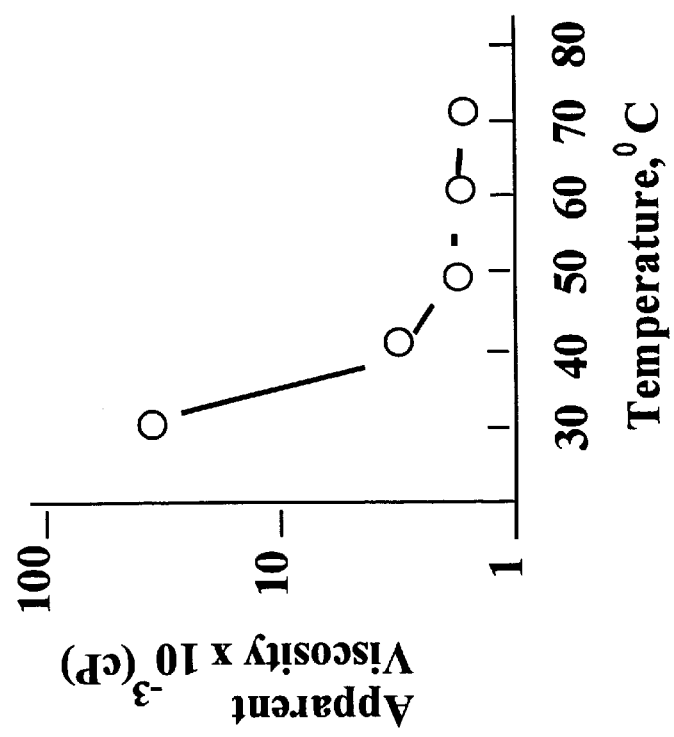
FIG. 2 is a plot of viscosity as a function of temperature for the most preferred gel-forming binder, agar.

FIG. 2 illustrates the viscosity characteristics of agar, the most preferred water-soluble, gel-forming binder, by graphically depicting the change in viscosity of a 2 wt % aqueous solution. The graph clearly illustrates the most important features of agar: low gel-forming temperature and rapid gelation over a narrow temperature range.

The binder is provided in an amount between about 0.5 to 10 wt % based upon the solids in the mixture. More than about 10 wt % of the binder may be employed in the mixture. Higher amounts are not believed to have any adverse impact on the process, although such larger amounts may begin to reduce some of the advantages produced by the novel compositions of the present invention, especially with respect to the production of net shape and near net shape bodies. Preferably, the amount of the most preferred gel-forming binder, agar, comprises between about 1.5 to 3% by weight of solids in the mixture.

The mixture further includes a liquid carrier. While any of a variety of carriers may be employed depending upon the composition of the binder, particularly advantageous carriers for the classes of binders useful in the invention are polar liquids such as water, alcohols and liquids such as glycols and carbonates and any mixtures thereof. It is, however, most preferable to employ a carrier which can also perform the dual function of being a solvent for the binder, thus enabling the mixture to be easily transported in the extruder, as well as readily supplied to a mold in a subsequent molding process. Applicants have discovered that water is particularly suited for serving the dual purpose noted above.

The liquid carrier is normally added to the mixture in an amount sufficient to produce a homogeneous mixture having a viscosity necessary to allow the mixture to be transported in the twin screw extruder, as well as to be molded by the desired molding process. Generally, the amount of liquid carrier is between about 35 to 60% by volume of the mixture depending upon the desired viscosity. In the case of water, which performs the dual function of being a solvent and a carrier for the powder/binder mixtures, the amount is generally between about 35 to 60% by volume of the mixture, with amounts between about 38 to 53% by volume being preferred.

The mixture may also contain a variety of additives that can serve any number of useful purposes. For example, coupling agents and/or dispersants may be employed to ensure a more homogeneous mixture. Boric acid and metal borate compounds can be added to increase the strength of as-molded parts and resist cracking upon removal of parts from a mold. Lubricants and other additives under the general classification of processing aids, such as monohedric and poly-hedric alcohols; glycerin; ethylene glycol; propylene glycol; oligomers and polymers of poly (ethyleneoxide); stearic acid and metal stearate compounds, may be added to assist in feeding the mixture along the bore of the barrel of an extruder or injection molding machine and reduce the vapor pressure of the liquid carrier, thereby enhancing the production of the near net shape objects.

The amount of additives will vary depending on the additive and its function within the system. Dispersants are frequently added to ceramic suspensions to enhance dispersion. Preferred amounts of dispersants are generally between about 0.2 to 2% by weight based on the solids in the mixture. Coupling agents may be used to facilitate compatibility between powder and matrix in amounts preferably between about 0.2 to 1.5% by weight based on the solids in the mixture. Boric acid and metal borates may be used in amounts from about 0.01 to 1% by weight of the total mixture. Lubricants and other processing aids may be added in amounts ranging from about 0.1 to 10% by weight of the solids in the mixture, the specific amount being dependent on the particular purpose intended. Biocides may be added to impede bacterial growth in amounts preferably between about 0.01 to 0.5% by weight based on the total mixture.

The mixture is maintained in the barrel of the extruder at a temperature sufficient to homogenize the ingredients in the mixture. Generally, the temperature is maintained between about 0 to 100° C. For the most preferred binder agar, which has a gel point of 37° C., the temperature is preferably between about 40 to 99° C. and most preferably between about 75 to 95° C.

The mixture is extruded through a die installed at the end of the extruder to produce material in the form of "spaghetti" strands and a variety of cross sectional shapes and dimensions. Applicants have found strands having a circular cross section about 4 mm in diameter to be a particularly useful form. The die installed at the end of the extruder can be optionally heated or cooled, as deemed appropriate.

It should be understood that for certain binders the preferred temperature range may be different from the range stated above. For example, in the case of binders such as chemically derivatized cellulose compounds, which are soluble at normal, ambient temperatures and gel upon heating, the preferred temperature range in the extruder barrel would be between about 0 to 40° C.

After exiting the extruder, the strands are fed to a pelletizer and sliced into pellets approximately 8 mm in length. Applicants have found that when agar is used in the feedstock mixture, it is advantageous to deposit the strands onto a moving belt allowing the material to cool to below about 40° C. before entering the pelletizer. The strands are then sliced by a rotating cutting wheel in the pelletizer, producing feedstock in the form of pellets. The pellets are especially useful for fabricating articles by various molding processes, particularly injection molding.

Figure 3:
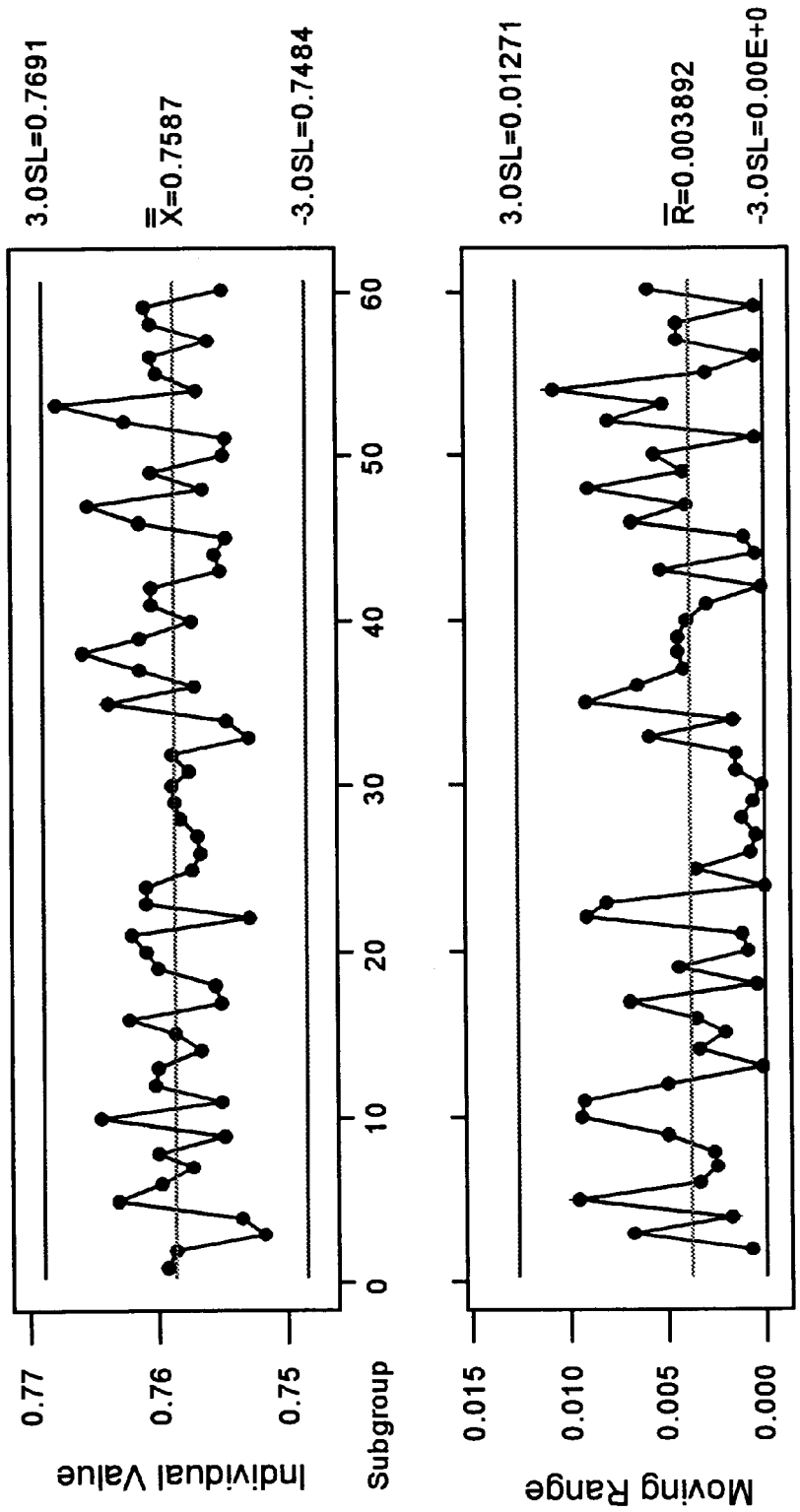
FIG. 3 is a graphic representation, in the form of a control chart, of the weight of metal powder delivered in 30 sec. intervals of time.

Attention is drawn to Table 1 and FIG. 3 in order to assess the typical performance of the extruder for producing feedstock. Table 1 provides a calculation of the variation in percent solids of the feedstock to be expected against target specification limits of ±0.2 wt % based on the tolerances specified by the manufacturers of the gravimetric feeding equipment. The calculation shown in the bottom last row of Table 1 is a "sigma" value, or equivalent "z-score," both of which are accepted measures of manufacturing performance. The reported sigma value of 8.41 reflects superb anticipated manufacturing capability.

TABLE 1

| Expected Performance of Twin-Screw Extruder (calculated) | |
|---|---|
| Metal powder feed rate, lb/h | 90 |
| Agar feed rate, lb/h | 1.8 |
| Water feed rate, lb/h | 6.3 |
| Feeder tolerances (manufacturer specifications), % | 1.0 |
| Individual feeder sigma values (z-scores) | 4.28 |
| Average solids content of feedstock, wt% | 93.58 |
| Target specification limits on feedstock, wt% | ±0.2 |
| Calculated manufacturing sigma value (z-score) | 8.41 |

FIG. 3 shows graphically the amount of metal powder delivered to the extruder in 30 sec. intervals set at a nominal rate of 91 lb/hr. The upper Individual Value chart (IV-chart) plots the actual weights of powder delivered in sequential 30 sec. intervals, while the lower Moving Range chart (MR-chart) plots the moving range values of the weight delivery data. The control limits shown on the charts are calculated at three standard deviations. The charts were produced from analysis of the feeding data by the Minitab® statistical software package. The average feed rate is 0.7587±0.0104 lb/30 sec. (3 standard deviations), which corresponds to an hourly feed rate of 91.6±1.25 lb/hr. (3 standard deviations). The charts indicate that the feed process is in control with excellent consistency, and the coefficient of variation for the feed process is 0.0046.

The molding compounds prepared according to the present invention are ideally suited to fabrication of articles by molding processes in general, and injection molding in particular. The feedstock material may be supplied to a mold by any of a variety of well-known techniques including gravity feed systems, and pneumatic or mechanical injection systems. Injection molding is the most preferred technique because of the fluidity and low processing temperatures of the mixtures. The latter feature, low processing temperatures, is especially attractive in reducing the thermal cycling to which the molds within the injection molding equipment are subjected, thus increasing mold life.

A broad range of molding pressures may be employed. Generally, the molding pressure is between about 20 to 3,500 psi, although higher or lower pressures may be employed &ending upon the molding technique used. Preferably, the molding pressure is in the range of about 100 to 1500 psi, and most preferably, about 250 to 750 psi. An advantage of the present invention is the ability to mold the novel compositions using low pressures.

The mold temperature must, of course, be at a level capable of producing a self-supporting body. In the case of the preferred binder material, agar, the temperature of the mold must be at or below the gel point of the agar in order to produce a self-supporting body. The appropriate mold temperature can be achieved before, during or after the mixture is supplied to the mold. Ordinarily, the mold temperature is maintained at less than about 40° C., and preferably is between about 10 to 25° C. Optimum production rates are expected to be achieved with an injection molding process. The most preferred gel-forming material, agar, is employed in the molding compound, which is maintained at about 90° C. or less, and the mixture is injected into a mold maintained at about 25° C. or less.

However, as noted above in the case of gel-forming materials that gel upon heating, optimum production rates would be achieved when the mixture is maintained between about 0 to 40° C. and supplied to a mold maintained above the gel point of the gel-forming material in a temperature range from about 35 to 100° C., and preferably from about 45 to 75° C.

After the part is molded and solidified in the mold, it is removed from the mold and dried. The resulting green body is self-supporting, requiring no special handling before being placed into the furnace where it is fired to produce the final product. The firing times and temperatures (firing schedules) are regulated according to the powder material employed to form the part. Firing schedules are well known in the art for a multitude of materials and need not be described herein. Metallic products are normally fired in a reducing atmosphere, e.g., hydrogen, mixtures of hydrogen in argon and/or nitrogen, and cracked ammonia. Before being brought to the sintering temperature, a body containing metal may be heated in air at slightly elevated temperatures to about 300° C. to assist in removal of the small amount of organic matter in the body.

Having described the invention in full, clear and concise terminology, the following examples are provided to illustrate some embodiments of the invention. The examples, however, are not intended to limit the scope of the invention to anything less than is set forth in the appended claims.

EXAMPLES

The theoretical densities for 316L and 17-4PH stainless steels are 8.02 g/cm$^3$ and 7.78 g/cm$^3$, respectively. The shrinkage of molded parts on firing is approximately 16%.

Example 1

Batch EX-1

A 27mm twin screw extruder was used to prepare 17-4PH stainless steel feedstock. The agar, pre-blended with biocide and calcium borate, was fed into the first zone of the extruder. Stainless steel powder was introduced through a separate port. Computer-controlled gravimetric feeders were used to deliver the powdered materials. Water was delivered through a third port by means of a diaphragm pump. The rates were adjusted to produce continuously, equivalent to 20 lb. feedstock per hour, a composition containing in weight percent, nominally, 90.6% 17-4PH stainless steel powder, 1.9% agar, 0.1% calcium borate, 0.032% biocide and 7.3% water. The temperature of the extruder was maintained at approximately 85° C.and the exit die at approximately 77° C. The extruder was run at a speed of 300 RPM. The molten material was extruded through a die containing a single circular hole at a production rate of approximately 60 lbs. per hour. The extruded strand was transported along a conveyor belt into a rotating-blade pelletizer, producing extrudates around 8 mm in length by 4 mm in diameter.

Tensile bars (dimensions, nominally, 6½×½×¼") were molded from this batch at about 600 psi (hydraulic) and 85° C. and fired in a standard tube furnace yielding an average density of about 7.725 g/cm$^3$ (four samples).

Example 2

Batch EX-12

The procedures of Example 1 were followed to produce 316L stainless steel feedstock having a composition containing in weight percent, nominally, 90.9% 316L stainless steel powder, 1.9% agar, 0.019% calcium borate, 0.032% biocide and 7.1% water. The biocide was pre-blended with the agar, and the calcium borate was fed as a solution of calcium borate in water. Feedstock was produced at a continuous production rate of approximately 55 lbs. per hour. The material was extruded and pelletized, as in Example 1. Tensile bars were molded at about 800 psi (hydraulic) and 85° C. and fired in a batch furnace to an average density of about 7.64 g/cm$^3$.

Example 3

Batch EX-18

The procedures of Example 1 were followed to produce a 17-4PH stainless steel composition containing in weight percent, nominally, 90.6% 17-4PH stainless steel powder, 1.9% agar, 0.019% calcium borate and 7.3% water (solution containing the calcium borate), at a production rate of approximately 100 lbs. per hour. The material was extruded and pelletized as in Example 1. Tensile bars were molded at about 800 psi (hydraulic) and 85° C. and fired in a tube furnace to an average density of about 7.723 g/cm$^3$. Three samples of the sintered tensile bars were determined to have an ultimate tensile strength of about 150,600 psi, and plastic elongation of about 6.9%.

While this novel material compounding process was utilized in the examples described herein to make 316L and 17-4PH stainless steel feedstocks, many other materials could similarly be utilized to make molding compositions by this process. These materials include, without limitation, Hastex, 17-7, HK-30, H-11, Pamco (17-4, 410, 444 and HK-30), Inconel 718, GMR-235, titanium, tungsten, gold, silver, platinum, iron2nickel and phosphorus-iron alloys. By utilizing the steps of the present invention, molding compositions of these alloys could be produced that would be capable of being shaped into complex parts as described herein.

We claim:

1. A method for continuously forming a molding feedstock composition comprising the steps of:
   a) delivering to a twin screw extruder:
      1) powder containing at least one member selected from the group consisting of pure metals, alloys, intermetallic compounds, oxides, borides, nitrides, silicides and carbides of metals, nonmetals, or mixtures thereof, and mixtures of such materials;
      2) a binder; and
      3) a liquid carrier;
   b) compounding the ingredients in the extruder at a temperature sufficient to produce a homogeneous feedstock composition comprising the powder, binder and liquid carrier;
   c) forcing the homogeneous compounded mixture through a die containing an opening to produce a continuous strand of the composition; and
   d) cutting the extruded strand into pellets.

2. The method of claim 1, wherein the binder is selected from the group consisting of naturally occurring polysaccharides, synthetic polysaccharides, cellulose, chemically modified cellulose, gelatin, alginate compounds, poly(acrylamide), poly(vinylalcohol) and mixtures thereof.

3. The method of claim 2, wherein the naturally occurring polysaccharide comprises agar, agarose, carrageenen, guar, locust bean, xanthan, tragacanth, gum arabic or mixtures thereof.

4. The method of claim 1, wherein the binder is selected from the group consisting of agar, agarose and mixtures thereof.

5. The method of claim 1, wherein the powder comprises between about 40 to 75% by volume of the mixture.

6. The method of claim 1, wherein the binder comprises between about 0.5 to 10% by weight of the mixture.

7. The method of claim 1, further comprising the step of maintaining the mixture at a temperature sufficient to homogenize the ingredients in the extruder.

8. The method of claim 7, wherein the temperature of the mixture in the extruder is between about 0 to 100° C.

9. The method of claim 1, wherein the mixture further comprises additives selected from the group consisting of boric acid and metal borate compounds, coupling agents, dispersants, mono-hedric and poly-hedric alcohols, glycerin ethylene glycol, propylene glycol, oligomers and polymers of poly(ethyleneoxide), stearic acid, metal stearate compounds and biocides.

10. The method of claim 9, wherein the borate compound is present in an amount up to about 10% by weight of the gel forming binder in the mixture.

11. The method of claim 1, wherein the liquid carrier is water.

12. The method of claim 1, wherein the liquid carrier is selected from the group consisting of alcohols, amines, amides, carbonates, carboxylic acids, aldehydes, ketones, glycols and mixtures, thereof.

13. The method of claim 1, wherein the die is maintained at a temperature sufficient to produce a continuous strand of material.

14. The method of claim 13, wherein the temperature of the die is maintained between about 0 to 100° C.

15. The method of claim 1, wherein the pellets are used in a molding process to produce self-supporting articles.

16. The method of claim 15, wherein the molding process is injection molding.

17. The method of claim 1, wherein the powder is selected from the group consisting of316L, 17-4PH, Hastex, 17-7, HK-30, H-11, 17-4, 410, 444 and HK-30, Inconel 718, GMR-235, titanium, tungsten, gold, silver, platinum, iron2nickel and phosphorus-iron alloy.

18. The method of claim 10, wherein the borate compound is calcium borate.

* * * * *